(12) United States Patent
Granville

(10) Patent No.: US 12,284,103 B2
(45) Date of Patent: *Apr. 22, 2025

(54) METHOD AND SYSTEM FOR SCORING QUALITY OF TRAFFIC TO NETWORK SITES

(71) Applicant: CHANDLER WILKINSON, LLC, Valley Village, CA (US)

(72) Inventor: Vincent Granville, Issaquah, WA (US)

(73) Assignee: CHANDLER WILKINSON, LLC, Valley Village (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,324

(22) Filed: Oct. 9, 2023

(65) Prior Publication Data

US 2024/0223485 A1 Jul. 4, 2024

Related U.S. Application Data

(63) Continuation of application No. 18/115,472, filed on Feb. 28, 2023, now Pat. No. 11,818,026, which is a
(Continued)

(51) Int. Cl.
*G06Q 30/00* (2023.01)
*G06Q 30/02* (2023.01)
(Continued)

(52) U.S. Cl.
CPC ......... *H04L 43/0876* (2013.01); *G06Q 30/02* (2013.01); *G06Q 30/0263* (2013.01);
(Continued)

(58) Field of Classification Search
CPC .............. H04L 43/0876; H04L 41/046; H04L 63/1408; H04L 63/1433; H04L 63/168;
(Continued)

(56) References Cited

U.S. PATENT DOCUMENTS 6,285,987 B1 9/2001 Roth et al.
6,662,227 B2 12/2003 Boyd et al.
(Continued)

FOREIGN PATENT DOCUMENTS

GB 2370888 A 7/2002
GB 2370888 B 3/2003
(Continued)

OTHER PUBLICATIONS

L. Dane and D. Gurkan, "Measuring Consistency Metric for Web Applications," 2022 IEEE 12th Annual Computing and Communication Workshop and Conference (CCWC), Las Vegas, NV, USA, 2022, pp. 0531-0537, doi: 10.1109/CCWC54503.2022.9720827. (Year: 2022) (Year: 2022).*
(Continued)

*Primary Examiner* — Sun M Li
(74) *Attorney, Agent, or Firm* — Kilpatrick Townsend & Stockton LLP

(57) ABSTRACT

A software and/or hardware facility for scoring the quality of traffic to a site accessible via the Internet or other network. The facility extracts data from one or more data logs that are obtained from a publisher, advertiser, or third party. A multi-factor analysis in the form of a rule set is applied by the facility to the data. The analysis of the data identifies agent actions that are desirable to a publisher, advertiser, or third party. The facility generates a relative score for each agent action. The score may be used to assess the quality of traffic received by a network site. Lower scores are indicative of traffic having little value, whereas higher scores are indicative of traffic having greater value. The score may be provided to an advertising network and used to charge a variable amount for advertisements based on the quality of traffic that the advertisements receive.

20 Claims, 5 Drawing Sheets

Related U.S. Application Data continuation of application No. 17/483,526, filed on Sep. 23, 2021, now Pat. No. 11,627,064, which is a continuation of application No. 16/791,388, filed on Feb. 14, 2020, now Pat. No. 11,792,101, which is a continuation of application No. 11/567,718, filed on Dec. 6, 2006, now Pat. No. 10,567,255.

(60) Provisional application No. 60/742,860, filed on Dec. 6, 2005.

(51) Int. Cl.
  G06Q 30/0241 (2023.01)
  G06Q 30/0251 (2023.01)
  G06Q 30/0273 (2023.01)
  H04L 9/40 (2022.01)
  H04L 41/046 (2022.01)
  H04L 43/0876 (2022.01)

(52) U.S. Cl.
  CPC ..... G06Q 30/0273 (2013.01); G06Q 30/0277 (2013.01); H04L 41/046 (2013.01); H04L 63/1408 (2013.01); H04L 63/1433 (2013.01); H04L 63/168 (2013.01)

(58) Field of Classification Search
  CPC ............... G06Q 30/02; G06Q 30/0263; G06Q 30/0273; G06Q 30/0277
  See application file for complete search history.

(56) References Cited

U.S. PATENT DOCUMENTS

| | | | |
|---|---|---|---|
| 7,085,682 B1 | 8/2006 | Heller et al. | |
| 7,349,827 B1 | 3/2008 | Heller et al. | |
| 7,584,287 B2 * | 9/2009 | Schneider | G06Q 30/0217 709/224 |
| 7,624,173 B2 * | 11/2009 | Bary | G06F 16/958 709/224 |
| 7,649,838 B2 * | 1/2010 | Fishteyn | G06Q 30/0247 709/224 |
| 7,668,946 B1 | 2/2010 | Garcia-Franco et al. | |
| 7,853,684 B2 * | 12/2010 | Koch | H04L 69/329 709/224 |
| 10,567,255 B2 | 2/2020 | Granville | |
| 11,627,064 B2 | 4/2023 | Granville | |
| 11,792,101 B2 | 10/2023 | Granville | |
| 11,818,026 B2 | 11/2023 | Granville | |
| 2003/0014539 A1 | 1/2003 | Reznick | |
| 2003/0023481 A1 | 1/2003 | Calvert et al. | |
| 2003/0187976 A1 * | 10/2003 | Decime | H04L 67/535 709/224 |
| 2003/0208594 A1 * | 11/2003 | Muret | H04L 67/142 709/224 |
| 2004/0133469 A1 | 7/2004 | Chang | |
| 2004/0153365 A1 * | 8/2004 | Schneider | G06Q 30/0217 705/14.19 |
| 2004/0190448 A1 * | 9/2004 | Fishteyn | G06Q 30/0283 370/229 |
| 2004/0225562 A1 * | 11/2004 | Turner | G06Q 30/0273 705/14.69 |
| 2005/0097204 A1 | 5/2005 | Horowitz et al. | |
| 2005/0144067 A1 | 6/2005 | Farahat et al. | |
| 2005/0223023 A1 | 10/2005 | King | |
| 2005/0256951 A1 | 11/2005 | Shapira et al. | |
| 2005/0256954 A1 | 11/2005 | Shapira et al. | |
| 2006/0075494 A1 * | 4/2006 | Bertman | G06F 21/566 726/22 |
| 2006/0149580 A1 | 7/2006 | Helsper et al. | |
| 2006/0253578 A1 | 11/2006 | Dixon et al. | |
| 2007/0073579 A1 * | 3/2007 | Immorlica | G06Q 30/0248 705/14.47 |
| 2007/0129999 A1 * | 6/2007 | Zhou | G06Q 30/0273 705/14.69 |
| 2007/0255821 A1 | 11/2007 | Ge et al. | |
| 2008/0077561 A1 | 3/2008 | Yomtobian | |

FOREIGN PATENT DOCUMENTS

| | | | |
|---|---|---|---|
| WO | 9939281 A2 | 8/1999 | |
| WO | 9939281 A3 | 12/1999 | |
| WO | 0045264 A1 | 8/2000 | |

OTHER PUBLICATIONS

X. Fu, B. Graham, R. Bettati and W. Zhao, "On countermeasures to traffic analysis attacks," IEEE Systems, Man and Cybernetics SocietyInformation Assurance Workshop, 2003., 2003, pp. 188-195, doi: 10.1109/SMCSIA.2003.1232420. (Year: 2003) (Year: 2003).*

"How to Keep Bad Robots, Spiders and Web Crawlers Away", Available Online at: http://web.archive.org/web/20000831062317/http://www.fleiner.com/bots/, Accessed from Internet on Sep. 27, 2021, 2 pages.

"Watching the Robots", sxw@tardis.ed.ac.uk, Aug. 16, 2000, 4 pages.

U.S. Appl. No. 11/756,568 , "Final Office Action", filed Jan. 8, 2013, 28 pages.

U.S. Appl. No. 11/756,568 , "Non-Final Office Action", filed May 8, 2012, 21 pages.

U.S. Appl. No. 16/791,388 , "Non-Final Office Action", filed Mar. 16, 2023, 35 pages.

U.S. Appl. No. 16/791,388 , "Notice of Allowance", filed Sep. 1, 2023, 17 pages.

U.S. Appl. No. 17/483,526 , "Final Office Action", filed Feb. 28, 2022, 48 pages.

U.S. Appl. No. 17/483,526 , "Non-Final Office Action", filed Nov. 5, 2021, 29 pages.

U.S. Appl. No. 17/483,526 , "Notice of Allowance", filed Feb. 17, 2023, 28 pages.

U.S. Appl. No. 18/115,472 , "Non-Final Office Action", filed Aug. 30, 2023, 16 pages.

U.S. Appl. No. 18/115,472 , "Notice of Allowance", filed Sep. 27, 2023, 16 pages.

Al-Khayatt , et al., "Automated Detection of Internet Usage Policy Violation", Proceedings ACS/IEEE International Conference on Computer Systems and Applications, 2001, pp. 507-510.

Chinese Application No. 200780018451.6 , "Office Action", Jun. 1, 2012, 7 pages.

Chinese Application No. 200780018451.6 , "Office Action", Nov. 2, 2011, 9 pages.

Dane , et al., "Measuring Consistency Metric for Web Applications", Institute of Electrical and Electronics Engineers, 12th Annual Computing and Communication Workshop and Conference (CCWC), Jan. 2022, pp. 0531-0537.

European Application No. 06846509.5 , "Examination Report", Feb. 10, 2012, 7 pages.

European Application No. 06846509.5 , "Extended European Search Report", May 3, 2011, 7 pages.

European Application No. 07758955.4 , "Extended European Search Report", Dec. 8, 2011, 8 pages.

European Application No. 07758955.4 , "Supplementary European Search Report", Dec. 27, 2011, 1 page.

Fu , et al., "On Countermeasures to Traffic Analysis Attacks", Institute of Electrical and Electronics Engineers Systems, Man and Cybernetics Society Information Assurance Workshop, Jun. 2003, pp. 188-195.

Kabe , et al., "Determining WWW User Agents from Server Access Log", Abstract, Proceedings Seventh International Conference on Parallel and Distributed Systems: Workshops, Jul. 4-7, 2000, pp. 173-178.

Padovan , et al., "A Prototype for an Agent-Based Secure Electronic Marketplace Including Reputation Tracking Mechanisms", Proceed-

(56) References Cited

OTHER PUBLICATIONS ings of the 34th Hawaii International Conference on System Sciences, Jan. 2001, pp. 1-10.

* cited by examiner

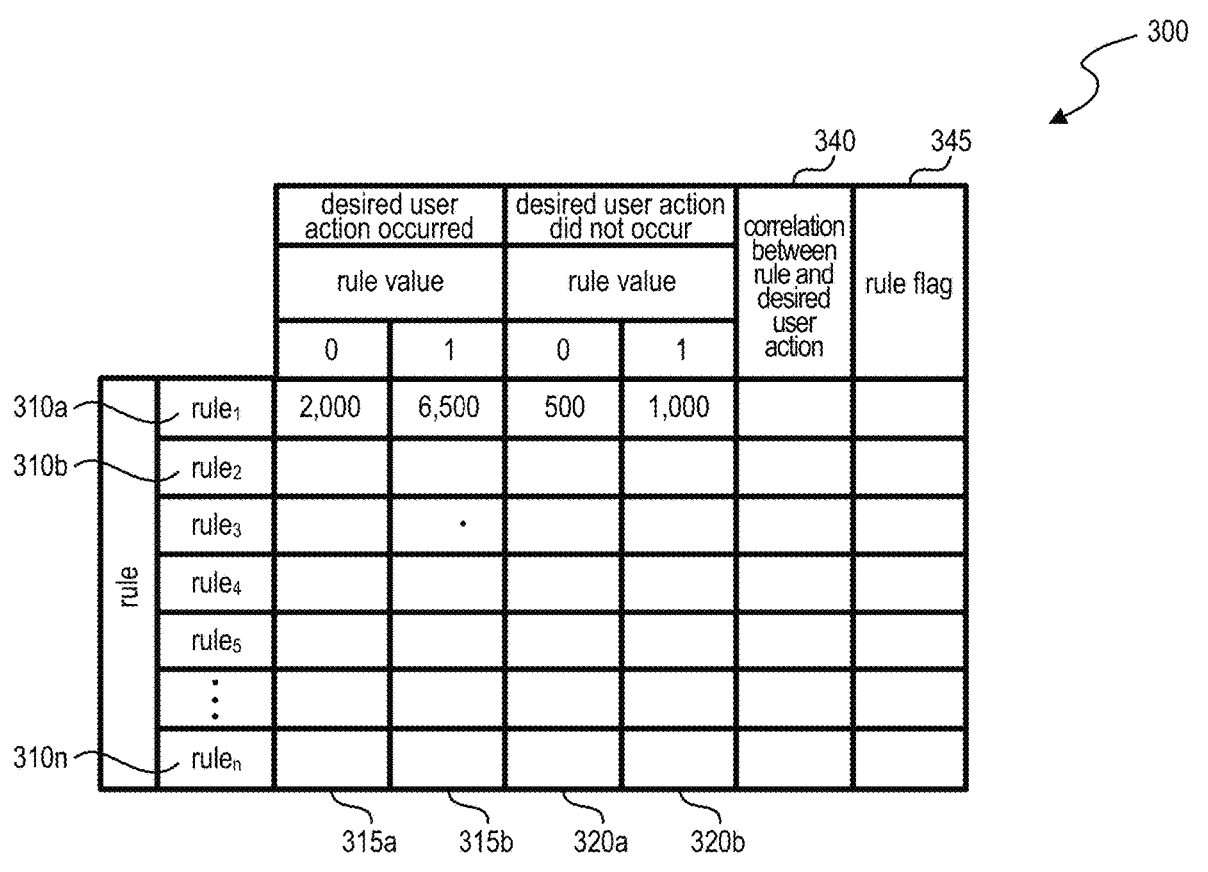

|  | | desired user action occurred | | desired user action did not occur | | correlation between rule and desired user action | rule flag |
|---|---|---|---|---|---|---|---|
|  | | rule value | | rule value | | | |
|  | | 0 | 1 | 0 | 1 | | |
| 310a | rule₁ | 2,000 | 6,500 | 500 | 1,000 | | |
| 310b | rule₂ | | | | | | |
|  | rule₃ | | · | | | | |
|  | rule₄ | | | | | | |
|  | rule₅ | | | | | | |
|  | ⋮ | | | | | | |
| 310n | ruleₙ | | | | | | |

*FIG. 4*

METHOD AND SYSTEM FOR SCORING QUALITY OF TRAFFIC TO NETWORK SITES

CROSS-REFERENCES TO RELATED APPLICATIONS

This application is a continuation of U.S. application Ser. No. 18/115,472, entitled "METHOD AND SYSTEM FOR SCORING QUALITY OF TRAFFIC TO NETWORK SITES" and filed Feb. 28, 2023, which is a continuation of U.S. application Ser. No. 17/483,526, filed Sep. 23, 2021, now U.S. Pat. No. 11,627,064, which is a continuation of U.S. application Ser. No. 16/791,388, filed Feb. 14, 2020, which is a continuation of U.S. application Ser. No. 11/567,718, filed Dec. 6, 2006, now U.S. Pat. No. 10,567,255, which claims priority to and incorporates by reference in its entirety, U.S. Provisional Application No. 60/742,860 filed on Dec. 6, 2005. Each of these foregoing applications are hereby incorporated herein in their entirety.

TECHNICAL FIELD

The disclosed technology relates to assessing the value of traffic associated with network sites.

BACKGROUND

An increasing number of companies, agencies, individuals, and other parties (collectively "advertisers") use online advertising to advertise to users of Internet or other network sites or services. An advertiser purchases advertising space from an individual publisher or from an advertising network that distributes advertisements to one or more publishers. A publisher or advertising network may charge the advertiser using one of several methods, including cost-per-click and cost-per-impression. In a cost-per-click system, an advertiser is charged based on the number of times that agents click on its advertisement. An advertiser is not charged when a publisher displays an advertisement to an agent unless the agent clicks on the advertisement. In a cost-per-impression system, an advertiser is charged based on the number of times a publisher displays its advertisement to an agent.

Click fraud, or fraudulent clicks on advertisements, is an issue that concerns advertisers and publishers who use cost-per-click and other payment models. Similarly, impression fraud, or displays of advertisements in situations where the advertisements will not make an impression on a human user, is an issue that concerns advertisers and publishers who use cost-per-impression and other payment models. Click or impression fraud can take a number of forms, including clicks on an advertisement by or displays of an advertisement to competitors, web robots, or users with personal or political agendas. In addition, an adware or clickware virus may install itself on a computer and generate clicks on or impressions of advertisements without the computer user's knowledge. Fraudulent clicks or impressions do not generate revenue or other value for an advertiser; however, the advertiser must pay for the clicks or impressions. Click or impression fraud therefore harms the advertiser by increasing advertising expense, and at the same time harms the publisher by lowering the perceived value of traffic the advertiser receives from the publisher.

In an effort to alleviate the problem of click or impression fraud, there have been attempts to create systems that detect click or impression fraud. Most click or impression fraud detection systems classify each click or impression in a binary manner as either "good" or "bad." Publishers may use the results of click or impression fraud detection systems in a number of ways. In some cases, a publisher may subtract bad clicks or impressions from the total number of clicks or impressions, charging an advertiser for only good clicks or impressions. Binary click or impression fraud detection systems, however, have several drawbacks. A click or impression may not fall neatly into either the good or bad category, or it may be impossible to determine from the data set that represents the click or impression whether in fact the click or impression is good or bad. A binary approach will therefore unfairly characterize those clicks or impressions that fall somewhere in between. In addition, advertisers may have differing thresholds as to the type of traffic they are willing to accept. One advertiser may consider a user simply viewing its web site as a valuable transaction; another advertiser may only consider a purchase to be a valuable transaction. A binary system does not allow an advertiser to set a level that determines the quality of traffic for which it is willing to pay the publisher. Advertisers and publishers alike would therefore benefit from having a more accurate system of click or impression fraud detection in order to better assess the value of traffic to publisher sites.

BRIEF DESCRIPTION OF THE DRAWINGS

FIG. 4 is a block diagram of a data structure used to compute the correlation between each rule in the rule set used to assess the quality of traffic to a network site and a desired agent action.

DETAILED DESCRIPTION

Figure 1:
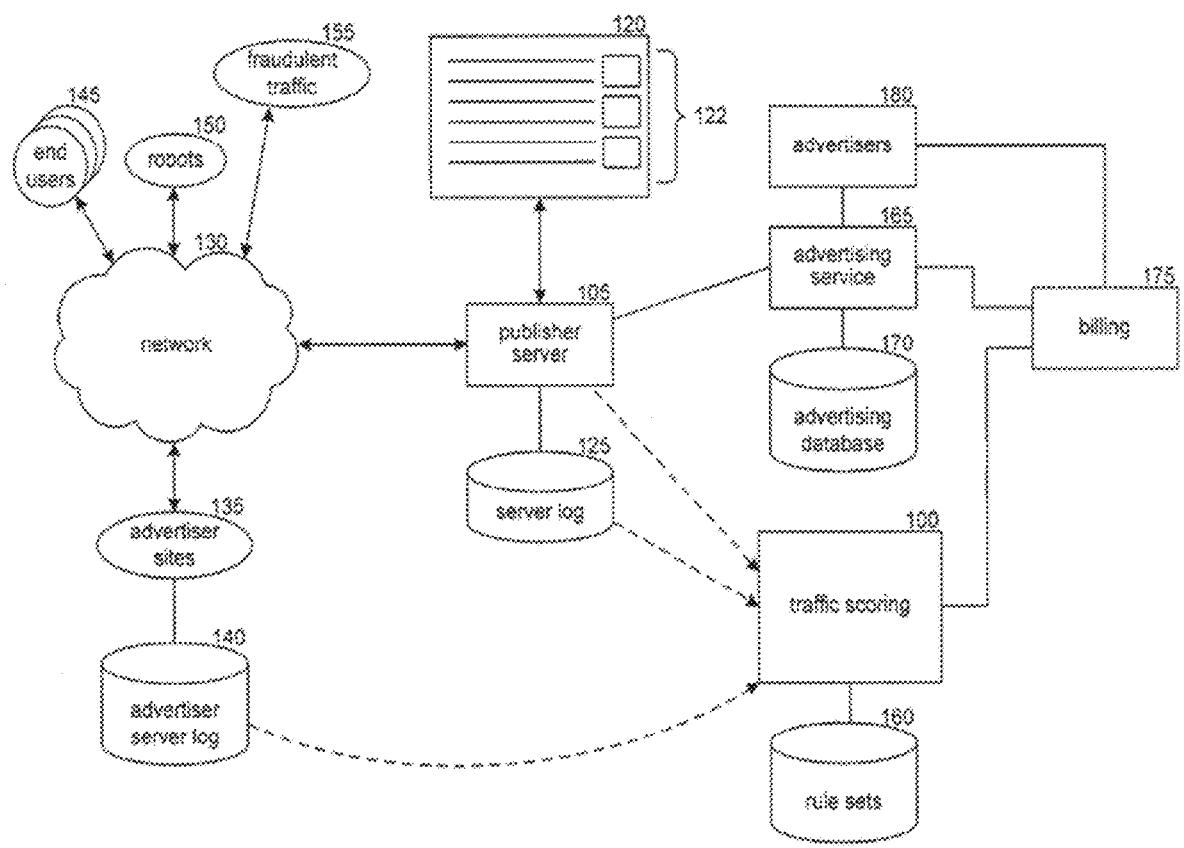
FIG. 1 is a block diagram of a representative facility for scoring the quality of network traffic and an environment in which the facility operates.

A software and/or hardware facility for scoring the quality of traffic to a site accessible via the Internet or other network is described. The facility extracts session data, or information identifying an agent's interactions with a server, from one or more server logs or other data sources that are obtained from a publisher, advertiser, or third party. In addition, the facility may obtain supplemental data from external data sources that assists in interpreting the agent's interactions with the server. A multi-factor analysis in the form of a rule set is applied by the facility to the session data. The analysis of the session data identifies agent actions that are desirable to a publisher, advertiser, or third party. Agent actions that are desirable to a publisher, advertiser, or third party include any activity that generates value for the publisher, advertiser, or third party, such as a click, a conversion (e.g., purchase), a submission of a form, bookmarking of the site, a rollover event, an impression, or other activity by the user. The facility generates a relative score for each agent action or for an aggregate number of agent actions based on whether the agent action is desired by the publisher, advertiser, or third party. The score may be used to assess the quality of the traffic received by a network site. Lower scores are indicative of fraudulent, likely fraudulent, or otherwise non-productive traffic having little value, whereas higher scores are indicative of traffic having desirable characteristics and therefore greater value.

In some embodiments, the score generated by the facility may be provided to the publisher or advertising network that published an advertisement. The publisher or advertising network may use the score for a number of purposes. For example, a publisher or advertising network may elect to use a pricing method that charges an advertiser a variable amount based on the score of the traffic an advertisement receives. The publisher or advertising network may decide not to charge for traffic that falls below a certain threshold. For example, certain sites desiring to market the high value of their traffic may elect to charge only for traffic having a score reflective of a low likelihood of fraud. In addition, a publisher or advertising network that receives a score on a real-time basis may decide not to display advertisements to agents that have a score indicating that the agent poses a high risk of fraud.

In some embodiments, the rule set used by the facility to generate the score may be manually determined. Rules used to determine the desirability of an agent action may include the physical location of the agent, the agent's browsing habits, search terms entered by the agent, rates charged to the advertiser for each agent action, the network topology from which the agent originated, and other characteristics. Rules may also be automatically determined by the facility based on the correlation between a trait of a given agent, advertiser, publisher, or other feature, and a measurement of the resulting fraudulent traffic associated with that trait. Different rule sets may be generated that are optimized for different environments Within each rule set, each rule may be weighted differently to generate an optimum combination of rules to comprise the rule set, and rules may be selectively removed if they do not perform well in an environment.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Overview

FIG. 1 is a block diagram illustrating the components of a traffic scoring facility 100 and a representative environment in which the traffic scoring facility operates. The traffic scoring facility 100 extracts data from publishers, advertisers, agents, and/or other parties to generate a relative score of the quality of traffic received by a site accessible by a network (hereinafter "a publisher site"). The generated score relates to the value of the traffic to that site as characterized by one or more parties associated with the site. For example, the publisher site may be a site that displays online advertisements, and the desired agent on that site may be a human user that would benefit from viewing advertisements, rather than robotic traffic or human users with fraudulent intent. The score generated by the facility would thereby relate to the likelihood that the agent was a human user with non-fraudulent intent.

The publisher site includes a publisher server 105 and a server log 125. The publisher server 105 serves one or more pages 120 containing content to an agent that interacts with the site. An agent is any human, software entity, or device that interacts with the site, including, but not limited to, a human user, a human user with fraudulent intent, a robot, spyware, an adware or clickware virus, or improperly operating software. The server log 125 stores session data associated with the agent's interactions with the publisher server 105. The publisher site 105 may be any type of site accessible via a network such as a search engine site, a directory site, a news or other content site, a social networking site, a photo sharing or other service site, or any other online property.

A publisher site will typically include or utilize the services of an advertising service 165 to populate the publisher page 120 that it produces with one or more advertisements. An advertiser 180 may purchase advertising placements on a publisher site in a variety of ways. For example, the advertiser may purchase keywords from the advertising service 165 that are relevant to the products and/or services that the advertiser offers. In the depicted environment, the advertising service 165 generates a list 122 of advertisements. The list may be generated by matching the keywords of a search query or a content page to advertiser-keyword pairings in its advertising database 170. The list 122 of advertisements generated by the advertising service 165 may be displayed on the publisher page 120, often above or alongside content provided by the publisher site.

When an agent takes an action associated with an advertisement displayed on a publisher page 120, the agent is directed to an advertiser site 135. Once at the advertiser site, the agent may interact with the site, such as by viewing content, purchasing products or services, and other activities. As the agent interacts with the advertiser site, data identifying an agent's actions is stored in a server log 140. As will be described herein, the data in the server log may be utilized to characterize the value of the agent's interaction with the advertiser site.

When an agent is displayed an advertisement, a record of the agent action is maintained by the advertising service 165 and the advertiser may be charged for the agent action. For example, if the advertising service relies on a cost-per-click model, the advertiser will be charged for an agent click on an advertisement. If the advertising service relies on an impression model, the advertiser will be charged for each time an advertisement is displayed to an agent. On a periodic basis, a billing component 175 may deduct an amount from an advertiser's account equal to the number of agent actions multiplied by the value the advertiser has agreed to pay for each agent action. Those skilled in the art will appreciate that various limits may be set by the advertiser on the amount of its advertising spending, such as setting a maximum amount to be paid for each agent action or an aggregate amount to be paid within a certain time period.

In the majority of cases, traffic to the publisher server 105 over a network 130 (such as the Internet) is of value to the publisher and to advertisers that advertise on the publisher site. For example, human users 145 may interact with the publisher server 105 and take action associated with advertisements in which they have an interest, leading to the possibility of monetary or other gain for advertisers. Unfortunately, a portion of the traffic to the publisher server 105 may come from sources that are not valuable to the publisher or advertisers. For example, robots 150 may arrive at a publisher site and click on advertisements in search of email addresses or other data. Such robotic traffic increases the load on the publisher site, while at the same time fails to generate valuable traffic for advertisers. Other traffic 155 with fraudulent intentions can also reach the publisher site. For example, individuals may click on or cause the display of advertisements of competitors, those with personal or political agendas contrary to their own, and others, all of which may intend to exhaust the advertising budget of the advertiser. Fraudulent traffic 155 does not generate valuable traffic for an advertiser and may also be of little value to the publisher.

In order to reduce the effect of fraudulent traffic on advertisers and publishers, a traffic scoring facility 100 may be operated by, or provided as a service to, publishers or advertisers. Data from server logs or other sources may be submitted to the traffic scoring facility 100. Data may also be submitted directly from the publisher server 105 to the traffic scoring facility 100 in real time. As will be described in additional detail herein, the traffic scoring facility applies one or more rule sets stored in data store 160 to the received data to generate a score that, on a per agent action or on an aggregate agent action basis, characterizes the traffic. The score reflects the anticipated value of the traffic, i.e., "good" traffic that is likely to be of value will receive a higher score and "bad" traffic that is likely to be of little value will receive a lower score.

Once a score has been computed for an individual agent action or for a group of agent actions, the traffic scoring facility 100 may provide the score to the billing component 175 of the advertising service. The advertising service may utilize the score in a variety of ways. For example, the advertising service may elect to use a pricing method that charges an advertiser 180 a variable amount based on the score of the traffic its advertisement receives. Traffic having a higher score may be charged to the advertiser at a higher rate, while traffic having a lower score may be charged to the advertiser at a lower rate. Alternatively, a publisher may agree not to charge an advertiser for traffic that does not exceed a certain score. In this manner, an advertiser has greater control over the quality of traffic to which it advertises. In addition, an advertiser may determine whether to continue using an advertising service 165 or a particular publisher based on the quality of traffic it receives. Based on the score of the traffic it receives, an advertiser may also decide to make adjustments to the keywords it purchases from the advertising service 165 or to its methodology for placing advertisements. In addition, an advertiser or publisher may use the score to assess the damage or loss of revenue resulting from low quality traffic.

As discussed above, the traffic scoring facility 100 utilizes one or more rule sets stored in data store 160 to rate the quality of traffic an advertisement receives. In a training phase, the facility analyzes traffic in one or more environments and selects an optimum set of rules (an "environment rule set") that may be used to score traffic within each environment. In a scoring phase, an environment rule set is applied to traffic from an environment to score traffic in that environment. Each of these phases will be discussed in detail below.

II. Training Phase

Figure 2:
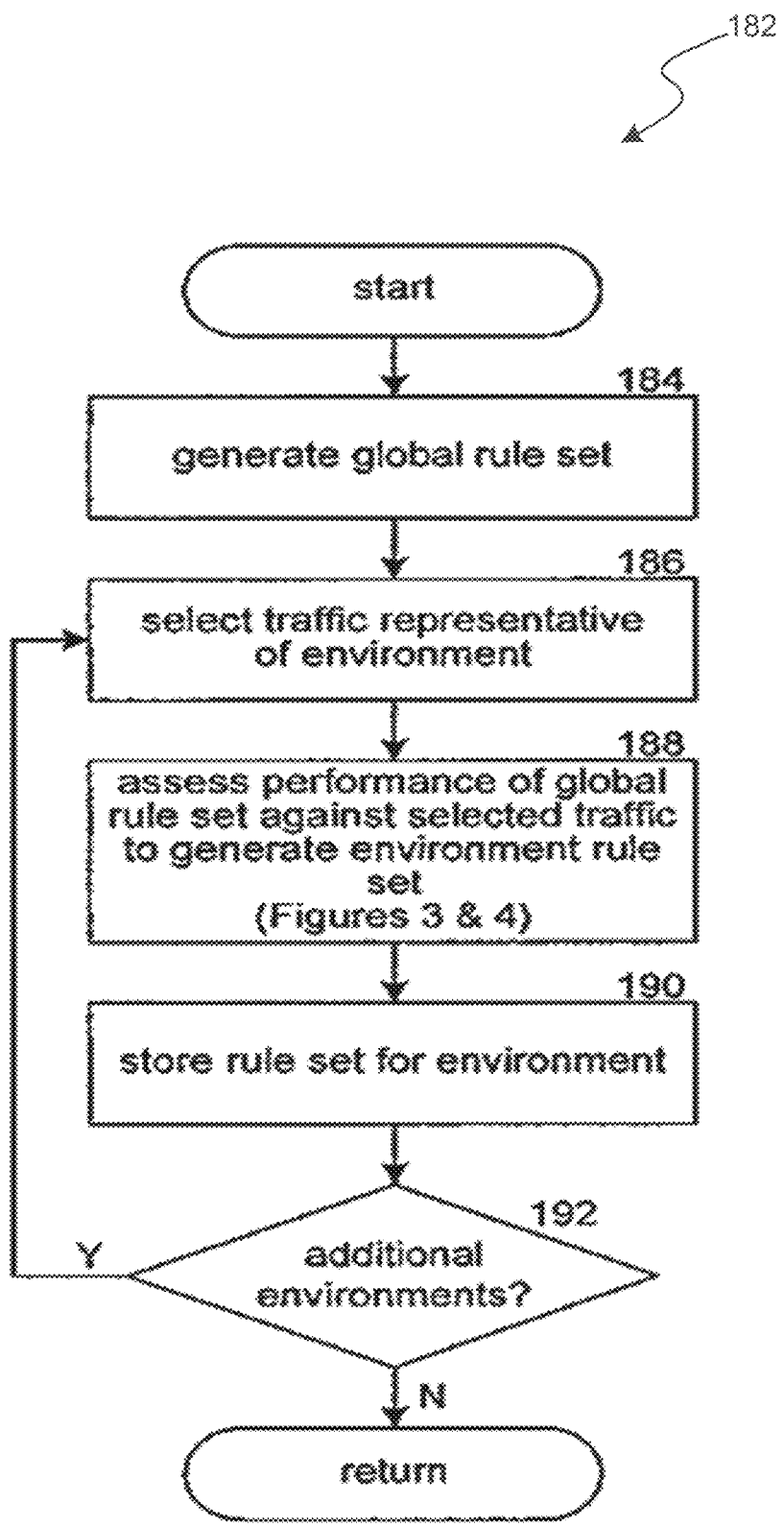
FIG. 2 is a flow diagram of a method of computing the quality of network traffic.

FIG. 2 is a flow chart of a process 182 for generating and validating rule sets that may be used to assess the value of traffic in various environments. At a block 184, a global rule set is generated. Each rule in the global rule set is an expression that receives as input one or more parameters associated with an agent's session. When the rule is applied by the facility to the input parameters, it produces a result that reflects the value of an agent's actions associated with that agent's session. Rules may measure agent activities, including the speed with which an agent clicks on an advertisement (i.e., velocity), the time an agent spends on an advertiser's site, or the length or number of keywords an agent enters as search terms. Rules may also measure other characteristics of the agent. For example, one rule may score IP addresses and maintain a "blacklist" of IP addresses that generate low quality traffic. The blacklist may contain IP addresses, scores generated by traffic originating from those IP addresses, and other details. The facility may evaluate an IP address associated with a new agent by referencing the blacklist. Agents having IP addresses on the blacklist may be scored appropriately, and agents having an IP address in close proximity to IP addresses on the blacklist may be scored based on a function of the numerical distance between the agent's IP address and blacklisted IP addresses. Rules may also measure publisher and advertiser characteristics, including where a publisher resides within an advertising network hierarchy or the amount of money an advertiser is charged for each agent action associated with an advertisement. A sophisticated rule related to a publisher distribution partner may measure whether more than a certain percentage (e.g., >80%) of the IP addresses associated with the publisher have multiple user agents associated with those IP addresses as measured on the day that a click from that distribution partner was received. Such a characteristic is often indicative of traffic with little or no value to an advertiser.

Each rule in the rule set may be phrased in a manner that allows the rule to be applied and the result to be expressed in binary form (i.e., "1" if the rule is satisfied or "0" if the rule is not satisfied). For example, a rule may be defined as a physical location of an agent, with a result of "1" if the physical location of the agent is in the United States and a result of "0" if the physical location of the agent is not in the United States. Alternatively, the rule may be phrased in a manner such that the result may be expressed as having a value that varies from 0 to N (e.g., when N equals four, the result may take a value of 0, 1, 2, 3, or 4).

The global rule set may be generated in a variety of ways. For example, the global rule set may be manually selected by an operator of the traffic scoring facility based on observed patterns of fraudulent traffic. The facility may also automatically generate rules as it identifies environment features that correlate with fraudulent traffic. The total number of rules in the global rule set may range from the tens to the hundreds or more. The global rule set is not static; rather, it can be supplemented and modified over time. Ineffective rules may be removed from the global rule set, just as new rules may be added as they are generated or found beneficial.

Once a global rule set has been generated, at a block 186 the facility selects a traffic data set representative of traffic in a particular environment. An environment may be any site, resource, or service having traffic that shares similar characteristics. For example, an environment may be a search web site that displays advertisements in conjunction with search results, an ecommerce web site that sells the products of an advertiser, or a content provider that offers a variety of services for others. The traffic data set may be represented in the form of a server log, log file, or other data format that allows various parameters associated with the traffic to be evaluated. In the event that actual traffic is not available, a training set of data that is believed to be reflective of the actual data may be used. Alternatively, a default training set of data may be used if no other agent action data is available.

Figure 3:
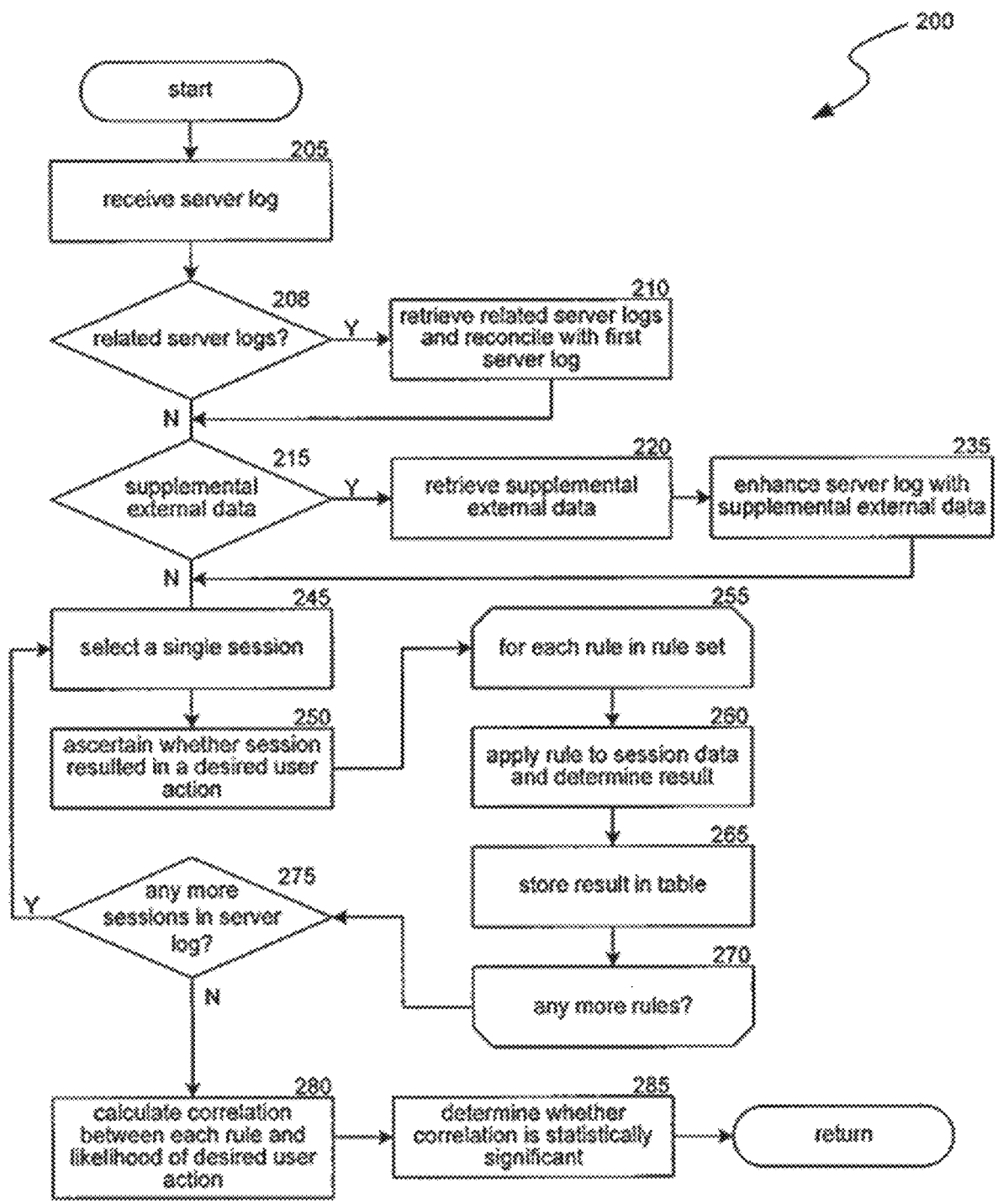
FIG. 3 is a flow diagram of a method of computing a correlation between a rule set that is used to assess the quality of traffic and a desired agent action.

At a block 188 the facility analyzes the global rule set to assess the ability of each rule in the global rule set to predict the likelihood of valuable traffic in the selected environment. That is, a determination is made as to the likelihood that a desired agent action will occur for each result permutation when a rule is applied to traffic associated with the environment. FIG. 3 is a flow chart of a process 200 that is implemented by the traffic scoring facility 100 to determine the correlation between each rule in the global rule set and a desired agent action. As part of the analysis, the facility may rely on one or more server logs or other data sources created and maintained by an advertiser or publisher, as well as one or more sources of external data provided by third parties that may be used to further characterize or enhance the content in the server log. At a block 205, the traffic scoring facility 100 receives a server log, which may be an advertiser server log 140 or a publisher server log 135. At a decision block 208, the facility determines whether there are other related server logs that may be used in the analysis. If other server logs exist, at a block 210 the related server log or logs are retrieved and reconciled with the first server log. At a decision block 215, the traffic scoring facility determines whether there is supplemental external data that may assist in interpreting a server log. Supplemental external data may include information from an advertiser about whether a conversion (e.g., purchase) or other desired agent action occurred, information from a publisher such as statistical information on advertisement performance, information relating to a geographical mapping of an IP address, and other types of information. If there is supplemental external data, the processing proceeds to a block 220 where the external data is retrieved.

Once the server log and any supplemental external data are retrieved, the facility proceeds to a block 235 where the server log is enhanced with the supplemental external data. For example, a server log retrieved from a publisher may not contain information about whether a conversion occurred, because a conversion occurs after an agent is transferred from the publisher site to an advertiser site. This data may only be available from an advertiser. In order to utilize the server log data to determine whether a correlation exists between a session and a conversion, data from the server log may be enhanced by data retrieved from the advertiser about whether a conversion occurred. As another example, in cases where the IP address associated with a particular agent is known, the IP address may be correlated with a geographical database to determine the rough geographical area from which the agent is accessing the site. Many types of supplemental external data can be used to enhance the data received from a server log.

At a block 245, the facility chooses a single session from the server log data, as enhanced by the supplemental external data. A session may be defined as one or more entries in the server log or other data source indicative of an agent's interaction with a network site. A session may contain no clicks, one click, or multiple clicks that occur as an agent interacts with the network site, and a session may span one or more visits to the network site within a period of time (e.g., within an hour, within 24 hours). Those skilled in the art will appreciate that it can be difficult to identify a single agent session for many reasons, including that agents often share an IP address or a session identifier, a unique agent may have an IP address that changes, and other reasons. To identify a single agent session, the facility may therefore apply one or more algorithms. Under a simple agent ID algorithm, an agent may be identified by the first three bytes of its IP address in combination with the User Agent ID identified by the server log. Under an advanced agent ID algorithm, an agent may be identified by a combination of the User Agent ID identified by the server log, the last two parts of the domain name associated with the IP address (or the first two bytes of the IP address if no domain name can be found), and, if there are two or more agent actions, the elapsed time between the agent actions. By parsing a server log to identify all entries in the sever log that satisfy the algorithm, the facility is able to generate a subset of actions within the server log that may be associated with the particular agent.

Once a single session of an agent is selected, at a block 250 the facility ascertains whether the session resulted in a desired agent action. A desired agent action is an action taken by an agent that generates value for the advertiser, such as monetary or other gain. Desired agent actions may be defined by the party generating the traffic score or by the party that will be receiving the traffic score. For example, if the desired action to be taken by a agent is the purchase of a product or service, a desired agent action may be defined as paying for the product or service. As another example, if the desired action to be taken by an agent is the viewing of a particular media clip, a desired agent action may be defined as the downloading of media content to an agent during a session. As still another example, a desired agent action may be a click on an advertisement that is displayed to the agent. A desired agent action may be globally recognized as beneficial by a large group of parties (e.g., the purchase of a product from a retailer or a human user), or more narrowly recognized as beneficial to a single party (e.g., the viewing of a trailer for a new movie at the site of the movie studio that is producing the movie).

For each rule in the global rule set, at a block 260 the facility applies the rule to the data associated with a single session and determines the result, e.g., "0" or "1" in the binary example described above. At a block 265, the facility stores the results in a table. FIG. 4 is a block diagram of a representative table 300 in which the results may be stored. Each row 310*a*, 310*b*, . . . 310*n* in the table corresponds to one rule in the global rule set (i.e., from $rule_1$ to $rule_n$)—The first four columns in the table are used to record the result as each rule is applied to the session data. Columns 315*a* and 315*b* correspond to sessions that resulted in desired agent actions. Column 315*a* reflects desired agent actions that occur when the result of the rule is "0" (i.e., the rule was not satisfied). Column 315*b* reflects desired agent actions that occur when the result of the rule is "1" (i.e., the rule was satisfied). A count is maintained in each column, and is incremented to reflect a result that falls within that column. Columns 320*a* and 320*b* correspond to sessions that did not result in desired agent actions. Column 320*a* reflects sessions where a desired agent action does not occur and the result of the rule is "0" (i.e., the rule was not satisfied). Column 320*b* reflects sessions where a desired agent action does not occur and the result of the rule is "1" (i.e., the rule was satisfied). Each time a session is analyzed, the count within a column is incremented to reflect the result. For example, FIG. 4 shows the results of rule1 for 10,000 agent sessions stored in row 310*a*. While only four columns are depicted in table 300 to reflect the results of applying a rule, those skilled in the art will appreciate that the number of columns may be any number that reflects the number of potential results for a rule. For example, a rule with three results ("0," "1," or "2") may require six columns—three devoted to the sessions that result in desired agent actions, and three devoted to sessions that do not result in desired agent actions. While FIG. 4 depicts a table whose contents and organization are designed to make it more comprehensible to the reader, those skilled in the art will appreciate that the actual data structure used by the facility to store this information may differ from the table shown. For example, the table may be organized in a different manner, may contain more or less information than shown, may be compressed and/or encrypted, and may otherwise be optimized in a variety of ways.

Returning to FIG. 3, at a block 270 a test is made by the facility to determine if there are any more rules in the global rule set to apply. If additional rules exist, processing loops to block 255 to process the next rule in the list. If additional rules do not exist, processing continues to a decision block 275.

At a decision block 275, the facility determines if additional sessions remain in the server log to be processed. If additional sessions exist that are to be processed, the facility returns to block 245 to select the next session in the log. The process defined by blocks 245 through 270 is thereby repeated as many times as necessary to process the session information of all agent sessions as reflected in the server log or other data log. If no additional sessions remain to be processed at block 275, processing continues to a block 280.

In some embodiments, the rule set is applied only to those entries in a server log that correspond to a click or impression. An entry in a server log that corresponds to a click or impression may be referred to as an atomic session. In the embodiments described, each rule in the rule set is applied only to each atomic session. This application of the rule set is particularly advantageous in the case of scoring clicks on or impressions of advertisements.

Once all sessions have been processed, at a block 280, the facility calculates a correlation coefficient that is representative of the likelihood that the session parameters tested by the rule will indicate a desired agent action. To calculate a correlation coefficient, an algorithm is applied to the session results stored in table 300. In some embodiments, a statistically significant number of agent actions must have been measured that resulted in both sessions in which a rule was satisfied and sessions in which a rule was not satisfied in order for a correlation coefficient to be calculated. If there are fewer than a certain number of agent actions (e.g., 50) where the rule is satisfied or, alternatively, fewer than a certain number of agent actions where the rule is not satisfied, the correlation coefficient is set to zero. In other words, if the rule is nearly always satisfied or never satisfied, the rule may not be a good predictor of a desired agent action in the selected environment. In some embodiments, for a correlation coefficient to be calculated, a rule must result in a statistically significant number of both desired agent actions and non-desired agent actions. If either all agent actions are valuable, alternatively, no agent actions are valuable, the correlation is set to zero. In other words, if a desired agent action either always occurs or never occurs, the rule may not be a good predictor of a desired agent action in the selected environment. If a sufficient number of agent actions are measured from both a rule satisfaction and a desired agent action standpoint, then a correlation coefficient may be calculated for that rule. The correlation coefficient may be calculated for each rule in accordance with the following equation (1):

$$\text{coefficient}(\text{rule}_x) = \frac{\text{val\_and\_rule\_satisfied}(\text{rule}_x) - (\text{val}(\text{rule}_x) \cdot \text{rule\_satisfied}(\text{rule}_x))}{\sqrt{\begin{array}{c}\text{val}(\text{rule}_x) \cdot \text{rule\_satisfied}(\text{rule}_x) \cdot \\ \text{non\_val}(\text{rule}_x) \cdot \text{rule\_not\_satisfied}(\text{rule}_x)\end{array}}}$$

where val_and_rule_satisfied is the percentage of the total number of agent actions in which a desired agent action occurs and the rule is satisfied (i.e., the percentage of agent actions that fall in column 315b); val is the percentage of the total number of agent actions in which a desired agent action occurs (i.e., the percentage of agent actions that fall in either column 315a or 315b); rule_satisfied is the percentage of the total number of agent actions in which the rule is satisfied (i.e., the percentage of agent actions that fall in either column 315b or 320b); non_val is the percentage of the total number of agent actions in which a desired agent action does not occur (i.e., the percentage of agent actions that fall in either column 320a or 320b); and rule_not_satisfied is the percentage of the total number of agent actions in which the rule is satisfied (i.e., the percentage of agent actions that fall in either column 315a or 320a). This correlation equation may be applied in circumstances when the result of the rule is binary (i.e., "0" or "1") and the occurrence of a desired user action is binary (i.e., a user action either did or did not occur). In other cases, an appropriately modified or different correlation equation may be used. The result of the correlation coefficient calculation for each rule is stored in column 340 of table 300.

While a particular algorithm is disclosed for calculating the correlation coefficient, those skilled in the art will appreciate that a variety of different algorithms may be used to determine how well each rule may predict that the traffic characterized by the rule is beneficial (e.g., will result in a desired agent action) or harmful (e.g., is associated with fraudulent traffic). Correlation coefficients may be used rather than regression coefficients (computed through logistic regression) since correlation coefficients offer a more robust methodology. That is, the logistic regression approach is a poor choice when the dependent variables are highly correlated. The correlation approach described herein can be viewed as a ridge regression where regression coefficients are constrained and must have the same sign as the rule correlations.

After calculating the correlation coefficient, at a block 285 the facility determines whether the correlation coefficient is statistically significant for the selected environment. The facility makes this determination by selecting only those rules that have a correlation coefficient that is in excess of a certain percentage. For example, the facility may keep only those rules that have a correlation coefficient in excess of 75% as part of a rule set that is associated with the environment (hereinafter, the "environment rule set"). If analysis of the correlation coefficient indicates that it is not statistically significant for the selected environment, the rule may be omitted from the environment rule set. The final column 345 in the table 300 contains a flag for each rule that may be set to a value of "0" or "1." Once the facility has determined at a block 285 whether the correlation coefficient is statistically significant, the result is stored in column 345. If a rule has a statistically significant correlation, the rule flag value in column 345 will be set to "1." If the rule does not have a statistically significant correlation, the rule flag value in column 345 will be set to "0." Only those rules with a rule flag value of "1," i.e., those that are statistically significant, will be used in determining a score of traffic in the selected environment. Rules that perform well for a particular environment are therefore maintained in the rule set for that environment, whereas rules that do not perform well for a particular environment are discarded.

Returning to FIG. 2, at a block 190 the environment rule set for the particular environment, including the correlation coefficients for each of the rules in the environment rule set, is stored by the facility so that it may be used again without having to re-execute the process indicated by FIGS. 3 and 4. After the environment rule set has been stored, the facility proceeds to a block 192 to determine whether there are any additional environments for which an environment rule set should be generated. If there are additional environments, processing loops to block 186 to process the next environment. Once the training phase is complete, the facility will have generated and stored a rule set for each identified environment. In this way, a unique rule set may be generated for each publisher, advertiser, or other characteristic, or any combination thereof. Each rule set will reflect the predictive parameters of the traffic received by that environment.

III. Scoring Phase

Figure 5:
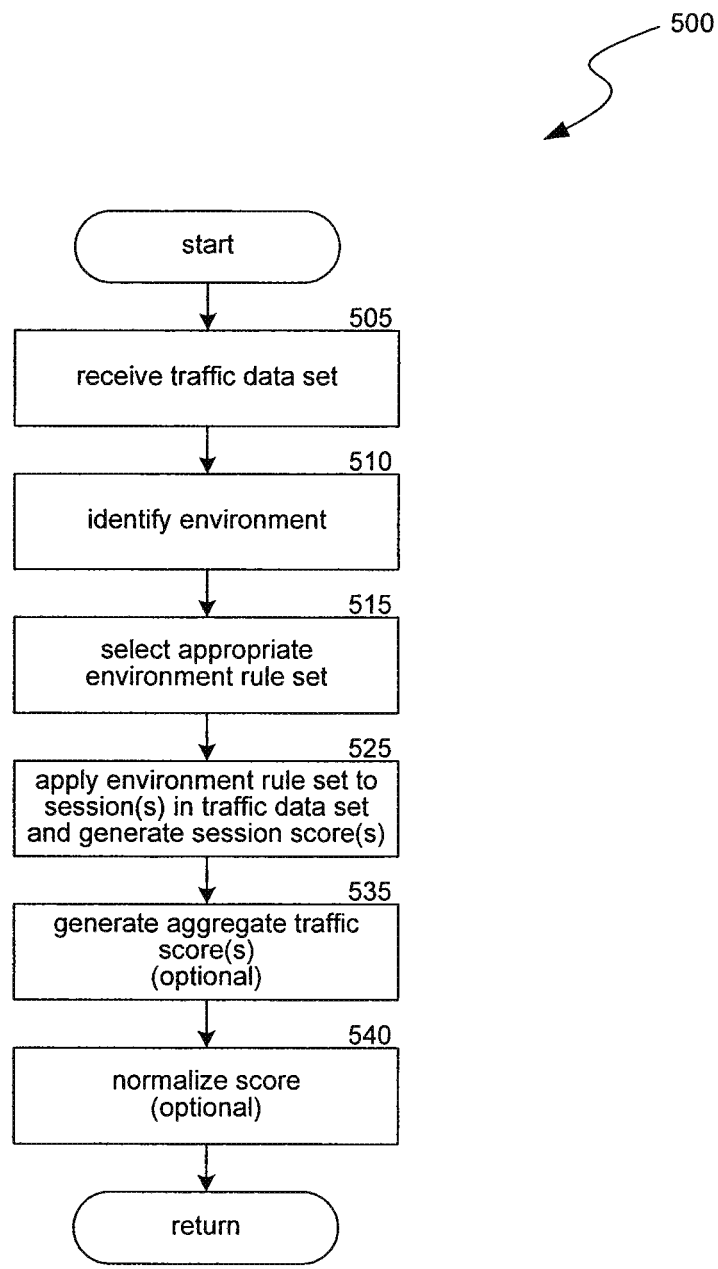
FIG. 5 is a flow diagram of a method of scoring an agent action based on a rule set.

Once a rule set has been determined for an environment in the training phase, future traffic to that environment may be scored using the environment rule set during a scoring phase. FIG. 5 is a flow diagram illustrating a process 500 of computing a score for a new agent action associated with an agent's interaction with a network site. At a block 505, a traffic data set is received by the facility reflecting an agent's interaction with a particular environment. As discussed above, the traffic data set may take the form of a server log, log file, or other form of data that allows various parameters associated with the traffic to be evaluated. As in the training phase, the received traffic data set may be reconciled with any supplemental external data or any other traffic data sets that are related to the received traffic data set. At a block 510, the facility identifies the environment with which the traffic data set is associated. The environment may be identified based on the publisher, advertiser, agent, and/or other feature of the environment. Once the environment has been identified, at a block 515, the stored environment rule set for the identified environment is selected by the facility. If no environment rule set is available for the identified environment, or if the environment cannot be reliably identified by the facility, a default rule set may be used by the facility.

Once an environment rule set or default rule set has been selected, at a block 525 the facility applies the environment rule set to each session within the traffic data set to generate a session score. To generate the score, the facility applies an algorithm that results in the summation of a function of the correlation coefficients over all rules in the environment rule set. The algorithm may be represented by the following equation (2):

$$\text{score} = \sum_{j=1}^{n} f(c_j) r_j$$

where there are n rules in the environment rule set, f(cj) is the correlation coefficient for each rule in the rule set, and rj is the result of the rule. The score calculated by equation (2) produces a score that is relative to the value of the session; higher scores indicate a more valuable agent action, whereas lower scores indicate a less valuable agent action. Calculating traffic scores in this fashion results in a more refined estimate of traffic value that is of greater benefit to publishers and advertisers.

In equation (2), each of the rules in the rule set is weighted equally. In some embodiments, it may be desirable to weight some rules more or less than others if the rules are deemed better or worse, respectively, than others at predicting whether a desired agent action will occur. In such a case, each rule may be weighted differently, e.g., by multiplying the rule by a coefficient prior to performing the summation. A weighted algorithm may be represented by the following equation (3):

$$\text{score} = \sum_{j=1}^{n} K_j f(c_j) r_j$$

where there are n rules in the environment rule set, Kj is the weight applied to the rule, f(cj) is the correlation coefficient for each rule, and rj is the result of the rule. Each rule may be weighted by a value chosen from a small set of preselected values and may be optimized for a particular environment.

Once a session score has been generated for each session within the traffic data set, at a block 535 the facility may aggregate all session scores to generate a score for all or portions of the traffic data set. An aggregate score may therefore be calculated for all traffic received by a publisher or advertising network, or it may calculated for a more limited environment defined by a single advertiser, publisher affiliate, or other group. In this manner, the quality of traffic may be determined globally for a publisher or advertiser network, or it may be determined on a per publisher affiliate, advertiser, or other group basis.

Once a score has been calculated by the facility, either for a single session, a portion of the traffic data set, or a traffic data set as a whole, the score may optionally be normalized to place it into a form that may be more readily understood and used by advertisers and publishers. At a block 540 the facility optionally normalizes the score so that the score will fall within a standard range. For example, the score may be normalized so that it always falls within a range from 300 to 800. When normalized in this fashion, each incremental change in the score may be more readily acted upon since the scale of the score has greater meaning. For example, a certain point change in a normalized score (e.g., a decrease of 50 points, as from 650 to 600) may correspond to a certain change in the proportion of agent actions that are valuable to an advertiser (e.g., the proportion of agent actions that are valuable to an advertiser is reduced by 50%). The score may also be converted into a non-numeric scale, such as an A+, A, B+, etc. scale, that may facilitate a greater understanding of and simplify the use of the score. By providing a gradated score for traffic, the facility significantly improves the ability of publishers and advertisers to use the score to assess the value of traffic.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the methods and system provided herein can be applied to other systems, not necessarily the system described above. The elements and operation of the various embodiments described above can be combined to provide further embodiments.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A computer-implemented method comprising:
   identifying, by a computer system comprising one or more hardware processors, a set of agent actions in a server log, wherein the set of agent actions comprises one or more clicks by agents when the agents interact via the Internet with an advertisement displayed on a publisher website, and wherein each agent action of the set of agent actions is associated with a combined identifier that includes: (i) an agent identifier of an agent that performed the agent action; and (ii) two or more parts of a domain name associated with the agent identifier;
   processing, by the computer system, the set of agent actions to generate a set of values, wherein the set of values represent indications of quality of clicks on the advertisement displayed on the publisher website, and wherein processing the set of agent actions includes:
      measuring an elapsed time between at least two consecutive clicks associated with the combined identifier; and
      determining a velocity with which a click associated with the combined identifier occurs on the advertisement displayed on the publisher website; and
   generating, based on the set of values and by the computer system, an output identifying that one or more of the clicks correspond to low quality clicks with the advertisement displayed on the publisher website.

2. The computer-implemented method of claim 1, further comprising causing an advertiser responsible for the advertisement to not be billed for the low quality clicks.

3. The computer-implemented method of claim 1, wherein the set of values represent an indication of high quality clicks, the indication of low quality clicks, and an indication of invalid clicks.

4. The computer-implemented method of claim 1, wherein the set of values for the clicks are used to assess a value of the advertisement.

5. The computer-implemented method of claim 1, wherein at least one of the agent actions results in a desired agent action, wherein the desired agent action comprises a conversion.

6. The computer-implemented method of claim 1, wherein the one or more low quality clicks are initiated by one or more of a bot, a spyware, an adware virus, a clickware virus, or an improperly operating software program.

7. The computer-implemented method of claim 1, wherein the one or more agent actions corresponding to the low quality clicks are identified further based on a determination that the agent is identifiable from a blacklist of network addresses.

8. A system comprising:
   one or more processors; and
   a non-transitory computer readable storage medium containing instructions which, when executed on the one or more processors, cause the one or more processors to perform one or more operations including:
      identifying a set of agent actions in a server log, wherein the set of agent actions comprises one or more clicks by agents when the agents interact via the Internet with an advertisement displayed on a publisher website, and wherein each agent action of the set of agent actions is associated with a combined identifier that includes: (i) an agent identifier of an agent that performed the agent action; and (ii) two or more parts of a domain name associated with the agent identifier;
      processing the set of agent actions to generate a set of values, wherein the set of values represent indications of quality of clicks on the content on the advertisement displayed on the publisher website, and wherein processing the set of agent actions includes:
         measuring an elapsed time between at least two consecutive clicks associated with the combined identifier; and
         determining a velocity with which a click associated with the combined identifier occurs on the advertisement displayed on the publisher website; and
      generating, based on the set of values and by the computer system, an output identifying that one or more of the clicks correspond to low quality clicks with the advertisement displayed on the publisher website.

9. The system of claim 8, wherein the instructions further cause the one or more processors to perform one or more operations including causing an advertiser responsible for the advertisement to not be billed for the low quality clicks.

10. The system of claim 8, wherein the set of values represent an indication of high quality clicks, the indication of low quality clicks, and an indication of invalid clicks.

11. The system of claim 8, wherein the set of values for the clicks are used to assess a value of the advertisement.

12. The system of claim 8, wherein at least one of the agent actions results in a desired agent action, wherein the desired agent action comprises a conversion.

13. The system of claim 8, wherein the one or more agent actions corresponding to the low quality clicks are initiated by one or more of a bot, a spyware, an adware virus, a clickware virus, or an improperly operating software program.

14. A computer-program product tangibly embodied in a non-transitory machine-readable storage medium, including instructions configured to cause one or more processors of a computer system to perform one or more operations including:

identifying a set of agent actions in a server log, wherein the set of agent actions comprises one or more clicks by agents when the agents interact via the Internet with an advertisement displayed on a publisher website, and wherein each agent action of the set of agent actions is associated with a combined identifier that includes: (i) an agent identifier of an agent that performed the agent action; and (ii) two or more parts of a domain name associated with the agent identifier;

processing the set of agent actions to generate a set of values, wherein the set of values represent indications of quality of clicks on the advertisement displayed on the publisher website, and wherein processing the set of agent actions includes:

measuring an elapsed time between at least two consecutive clicks associated with the combined identifier; and determining a velocity with which a click associated with the combined identifier occurs on the advertisement displayed on the publisher website; and generating, based on the set of values and by the computer system, an output identifying that one or more of the clicks correspond to low quality clicks with the advertisement displayed on the publisher website.

15. The computer-program product of claim 14, wherein the instructions further cause the one or more processors to perform one or more operations including causing an advertiser responsible for the advertisement to not be billed for the low quality clicks.

16. The computer-program product of claim 14, wherein the set of values represent an indication of high quality clicks, the indication of low quality clicks, and an indication of invalid clicks.

17. The computer-program product of claim 14, wherein the set of values for the clicks are used to assess a value of the advertisement.

18. The computer-program product of claim 14, wherein at least one of the agent actions results in a desired agent action, wherein the desired agent action comprises a conversion.

19. The computer-program product of claim 14, wherein the one or more agent actions corresponding to the low quality clicks are initiated by one or more of a bot, a spyware, an adware virus, a clickware virus, or an improperly operating software program.

20. The computer-program product of claim 14, wherein the one or more agent actions corresponding to the low quality clicks are identified further based on a determination that the agent is identifiable from a blacklist of network addresses.

\* \* \* \* \*